United States Patent [19]
Endo

[11] Patent Number: 4,965,809
[45] Date of Patent: Oct. 23, 1990

[54] UPLINK CROSS-POLARIZATION INTERFERENCE CANCELLER USING CORRELATION CALCULATOR AND STEPWISE TRACKING CONTROLLER

[75] Inventor: Kazuhito Endo, Tokyo, Japan

[73] Assignee: NEC Corporation, Japan

[21] Appl. No.: 372,671

[22] Filed: Jun. 28, 1989

[30] Foreign Application Priority Data

Jun. 29, 1988 [JP] Japan ................................ 63-161429

[51] Int. Cl.⁵ ........................... H04B 1/76; H04B 7/10
[52] U.S. Cl. ...................................... 375/38; 455/12;
 455/60; 455/63; 342/353; 342/361
[58] Field of Search ............... 455/12, 60, 63; 375/38,
 375/39; 342/352, 353, 361, 365; 329/311;
 370/6, 20

[56] References Cited

U.S. PATENT DOCUMENTS

| | | | |
|---|---|---|---|
| 4,146,893 | 3/1979 | Inagaki et al. | 455/60 |
| 4,369,519 | 1/1983 | Yuuki et al. | 455/60 |
| 4,857,858 | 8/1989 | Tahara | 329/311 |

*Primary Examiner*—Benedict V. Safourek
*Attorney, Agent, or Firm*—Laff, Whitesel, Conte & Saret

[57] ABSTRACT

In a satellite communications system, a rotatable 90° phase shifter and a rotatable 180° phase shifter introduce variable phase shifts to a single pilot signal, which is transmitted to the satellite. Downlink cross-polarization interference cancelling control signals are derived from a beacon signal received from the satellite. A pulse sequence is generated to modulate the amplitude of a carrier to produce an ASK signal as the pilot signal. A correlation calculator provides coarse mode interference cancellation by estimating uplink cross-polarization interference components from the downlink cross-polarization cancelling control signals and adjusting the angle settings of the 90° and 180° phase shifters with the estimated components. The pilot signal is transmitted back to the earth and synchronously detected with the pulse sequence to derive a DC signal which represents an uplink cross-polarization interference. A stepwise tracking controller provides fine mode interference cancellation by stepwisely varying the 90° and 180° phase shifters by predetermined amounts an detecting previous and recent values of the synchronously detected DC signal resulting from the stepwise variations, and repeating the stepwise variations until a difference between the previous and recent values is substantially reduced to a minimum.

4 Claims, 4 Drawing Sheets

UPLINK CROSS-POLARIZATION INTERFERENCE CANCELLER USING CORRELATION CALCULATOR AND STEPWISE TRACKING CONTROLLER

BACKGROUND OF THE INVENTION

The present invention relates generally to cross-polarized satellite transmission systems, and more specifically to an uplink cross-polarization interference canceller.

Orthogonal cross-polarization technique is employed in satellite communications systems to substantially double the bandwidth of transmission channels of the systems to achieve full utilization of satellite channel resources. With the known cross-polarization technique, two radiowaves of the same frequency are orthogonally cross-polarized with respect to each other to carry different information. Therefore, ambiguities must not exist to allow discrimination between the two cross-polarized signals. However, various factors affect on such signals. Differential phase and/or attenuation of microwave energy is one of such factors which is caused when a signal propagates pass through elliptically-shaped raindrops, resulting in the generation of undesirable cross-polarization components, or interference.

Two methods are currently known to cancel the cross-polarization interference in the uplink of a satellite communications system. One is a pilot control system and the other is a correlation method. While these techniques are fully described in a Japanese-language publication "Research on International Communications", Apr., 1981, pages 87 et seq.), a summary of these techniques will be given below with reference to FIG. 1.

In FIG. 1, the earth station transmits a first pilot signal $f_0(L)$ on a left-hand circularly polarized plane and a second pilot signal $f_1(R)$ on a right-hand circularly polarized plane. If the transmitted signal passes through a rainfall region, differential phase shift and/or attenuation occurs, so that portion of the signal on each polarization plane is rotated, resulting in the generation of interference components $\overline{(f_0(R)}, \overline{(f_1(L))}$. The satellite transponder provides frequency translation on received signals to a downlink frequency as well as polarization translation. If the received signal is a right-hand circularly polarized wave, the satellite transponder would transmit it to the downlink of another earth station. Namely, the right-hand circularly polarized components $(f_1(R), \overline{(f_0(R))}$ is not returned to the own earth station and the left-hand circularly polarized components $(f_0(L), \overline{(f_1(L))}$ are returned as signals $(F_0(R), F_1(R))$ to the own earth station after frequency and polarization translation processes. Since the pilot signal at frequency $f_1$ is a carrier-suppressed component of the other pilot signal at frequency $f_0$ according to the known technique, the same modulating signal as that of transmission is used to detect the phase and amplitude differences between the principle component $F_0(R)$ of the pilot signal and the cross-polarization component $F_1(R)$ by a synchronous detector. Based upon these differences, rotatable 90° and 180° phase shifters of the transmission circuit are controlled.

However, since the uplink's right-hand circularly polarized signal does not return to the own earth station, the current pilot method is not applicable to all satellite communications systems. More specifically, if the $F_1(L)$, which is a polarization translated version of the $f_1(R)$ component, is to be returned to the own earth station, such a returning signal will undergo polarization of opposite direction if it passes through a rainfall area and results in an undesired component $\overline{F_1(R)}$ which mixes with the $F_1(R)$ desired component. In addition, the pilot control method requires two pilot signals to be transmitted to two satellite translation circuits which respectively perform frequency and polarization translation and the earth station must be provided with high power amplifiers dedicated respectively for the two pilot signals in order to maintain them in a proper phase relationship. Further, the synchronous detector must be of high precision type. In addition, two transponders of the same frequency but opposite polarizations must be secured. This adds to the cost of maintenance.

On the other hand, the correlation method involves detecting the amplitude and phase information of the downlink cross-polarization interference from a beacon signal transmitted constantly from the satellite and estimating the cross-polarization interference of the uplink from the correlation between the downlink and uplink of the system to control the two phase shifters of the transmission circuit. Since interference cancellation is effected in an open loop on the basis of the correlation between signals on the downlink and those on the uplink, it lacks precision as compared with the cancellation method using two pilot signals.

SUMMARY OF THE INVENTION

It is therefore an object of the present invention to provide an uplink cross-polarization interference canceller which is simple for implementation, is capable of sufficiently suppressing the undesired cross-polarization interference components, and is applicable to all satellite communications systems regardless of the types of satellite.

In a satellite communications earth station of the present invention, a rotatable 90° phase shifter and a rotatable 180° phase shifter are connected in circuit for introducing variable angular shifts to a single pilot signal, which is transmitted to the satellite. Downlink cross-polarization interference cancelling control signals are derived from a beacon signal which is transmitted from the satellite. According to the present invention, an uplink cross-polarization interference canceller comprises a pulse generator for generating a pulse sequence, an amplitude modulator for modulating the amplitude of a carrier with the pulse sequence to produce an ASK signal as the pilot signal. A correlation calculator is provided for to perform coarse mode interference cancellation by estimating uplink cross-polarization interference components from the downlink cross-polarization cancelling control signals and adjusting the angle settings of the 90° and 180° phase shifters with the estimated components. The pilot signal received by the satellite is transmitted back to the earth and synchronously detected by a synchronous detector with the pulse sequence to derive a DC signal representative of an uplink cross-polarization interference. A stepwise tracking controller is provided for fine mode interference cancellation. The controller does this by stepwisely varying the angle setting of the rotatable 90° and 180° phase shifters by predetermined amounts, detecting previous and recent values of the DC signal resulting from the stepwise variations of the settings, and repeats the stepwise variations until a difference between the previous and recent values is substantially reduced to a minimum.

In a preferred embodiment, the stepwise tracking controller derives a correction signal representatitive of a weighted value of downlink cross-polarization interference as an indication of a change in a rainfall condition, subtracts the correction signal from the DC signal so that the previous and recent values are corrected by the rainfall change, and repeats the stepwise variations of the settings until a difference between the corrected previous value and the corrected recent value is substantially reduced to a minimum.

BRIEF DESCRIPTION OF THE DRAWINGS

The present invention will be described in further detail with reference to the accompanying drawings, in which.

DETAILED DESCRIPTION

Figure 1:
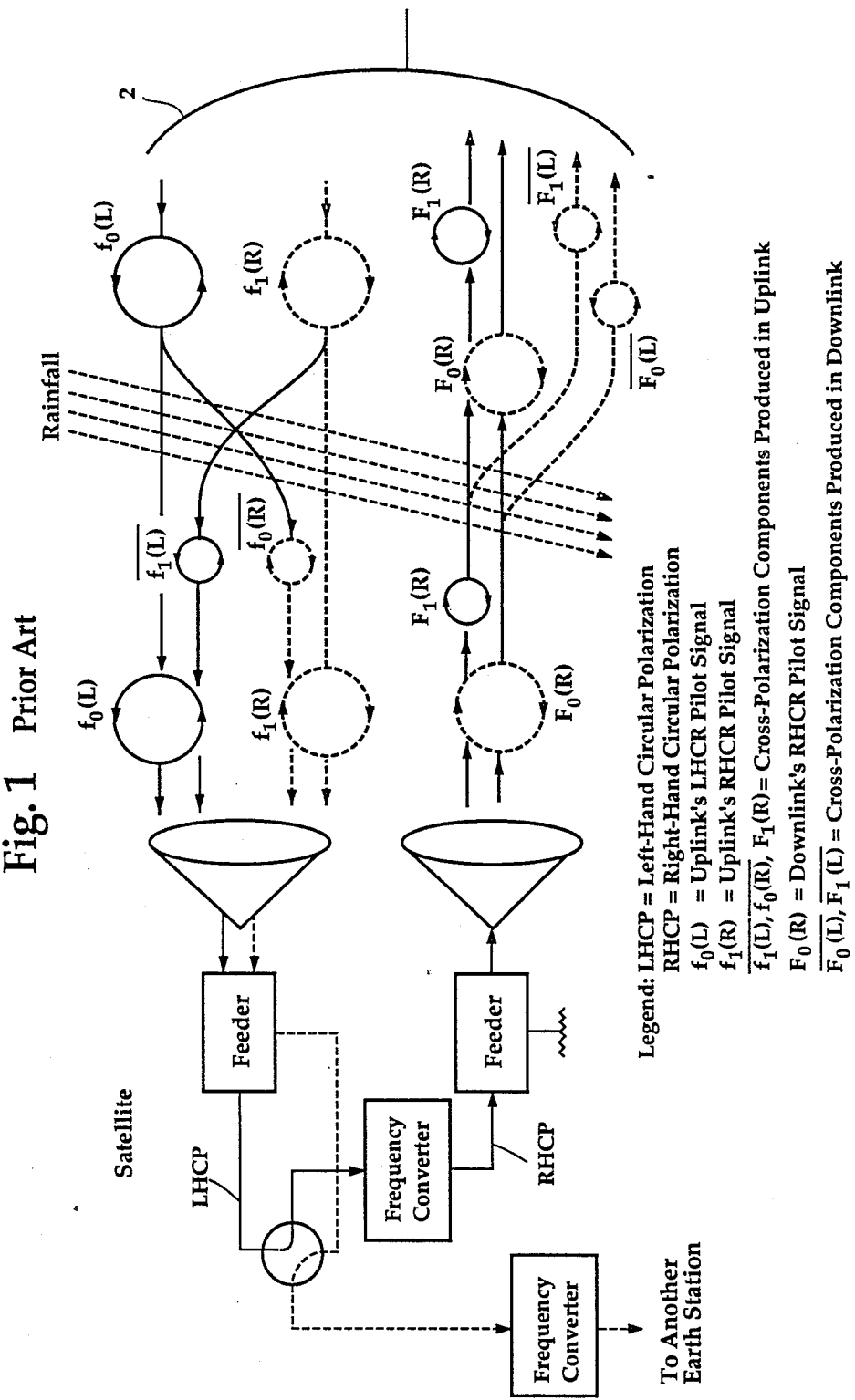
FIG. 1 is an illustration showing how signals of current satellite communications systems are affected by rainfall in a propagation path.
Figure 2A:
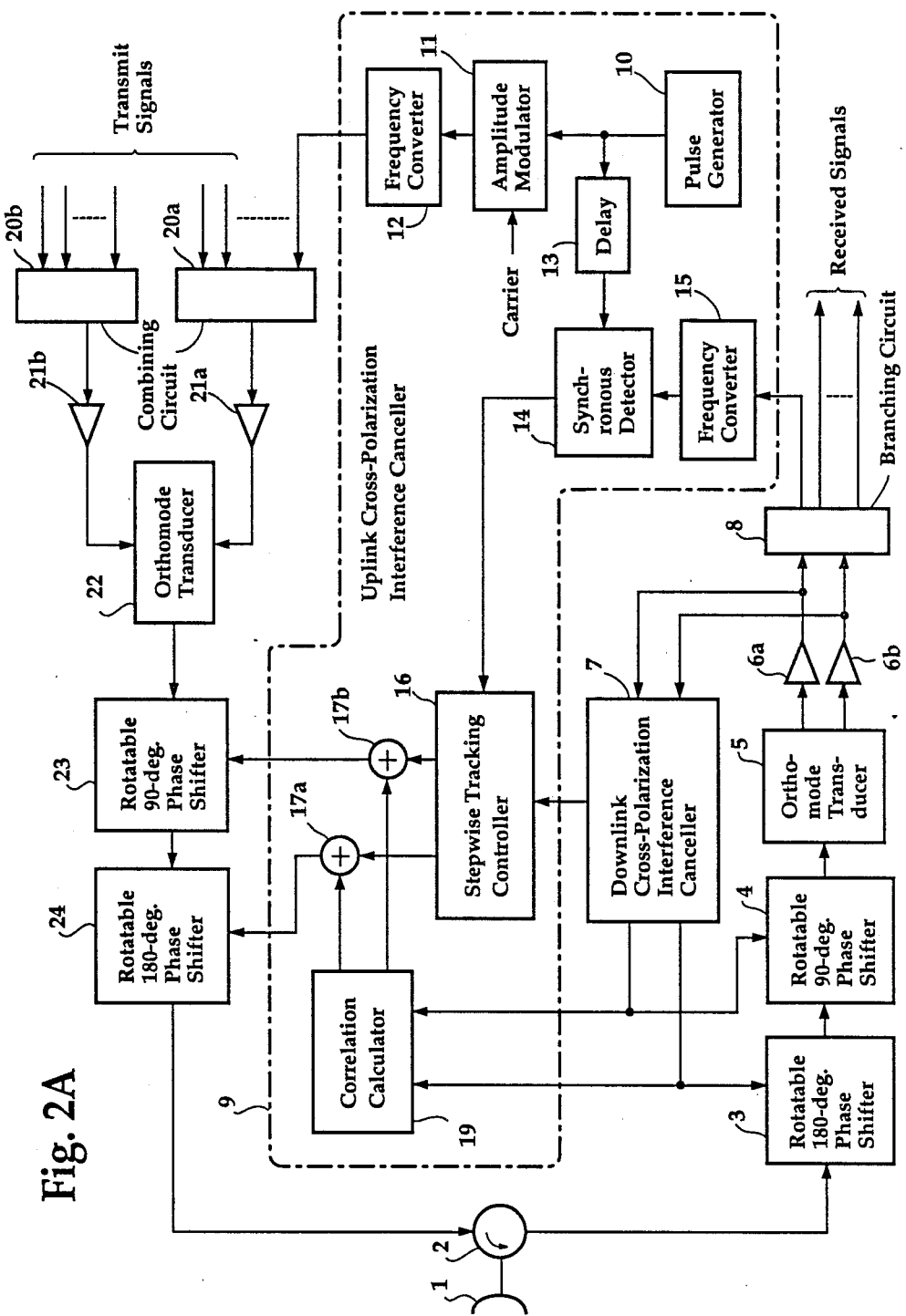
FIG. 2A is a block diagram of an earth station of the present invention incorporating the uplink cross-polarization interference canceller of the present invention.
Figure 2B:
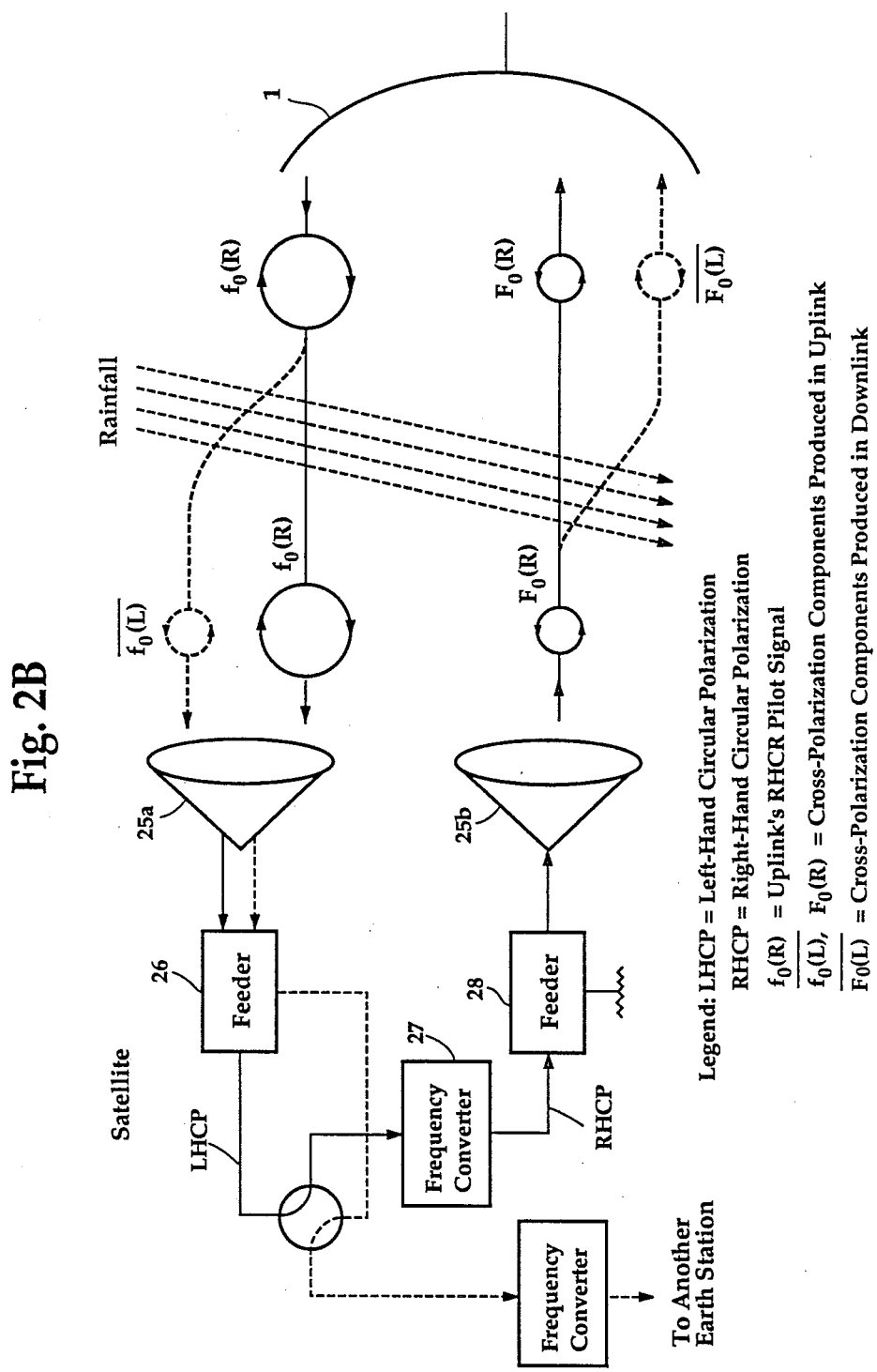
FIG. 2B is an illustration showing how signals of the satellite communications system of the present invention are affected by rainfall.

Referring now to FIGS. 2A and 2B, there is shown a satellite communications system of the present invention, with FIG. 2A showing an earth station and FIG. 2B showing how rainfall affects on the polarization planes of uplink and downlink signals in a propagation path between the earth station and the satellite. An orthogonally cross-polarized beacon signal is transmitted from the satellite, received by antenna 1 of the earth station and coupled through duplexer 2 to a series circuit of a rotatable 180° phase shifter 3 and and a rotatable 90° phase shifter 4. The output of phase shifter 4 is connected to an orthomode transducer 5 which isolates two orthogonally polarized waves, which appear at the inputs of low-noise amplifiers 6a and 6b for preamplification and are fed to a downlink cross-polarization interference canceller 7 on the one hand and to a branching circuit 8 on the other. Downlink cross-polarization interference canceller 7 is provided with a two-channel synchronous detector, not shown, to detect the in-phase, or co-polarization component and the quadrature-phase, or cross-polarization component of the orthogonally cross-polarized waves of the beacon and supplies interference cancelling control signals to the 180° and 90° phase shifters 3 and 4 in a manner known in the art, so that the cross-polarization interference between the I and Q signals of the downlink is reduced to a minimum. The downlink interference cancelling control signals are also supplied from the canceller 7 to a correlation calculator 19 of an uplink cross-polarization interference canceller 9 to generate coarse mode cancelling control signals for coarsely cancelling uplink cross-polarization interference.

Uplink cross-polarization interference canceller 9 cancels the uplink's cross-polarization interference, using a returned pilot signal and output signals from the correlation calculator 19 whose function will be described later. The uplink canceller 9 comprises a pulse generator 10, which generates a pulse sequence with a 1:1 duty cycle of a frequency, typically at 400 Hz, and supplies it as a modulating signal to an amplitude modulator 11 to cause it to modulate a 70-MHz sinusoidal waveform carrier supplied thereto, using amplitude shift keying technique. The ASK signal is a baseband pilot signal. For transmission to the satellite and back to the earth, the baseband pilot signal is converted by a frequency converter 12 to a frequency in the uplink's transmission band and supplied to a combining circuit 20a where it is combined with other transmit signals and fed through a high power amplifier 21a to one input of an orthomode transducer 22 to which the output of a combining circuit 20b is also supplied through another high power amplifier 21b. The output of orthomode transducer 22 is coupled through a series circuit including a rotatable 90° phase shifter 23 and a rotatable 180° phase shifter 24 to duplexer 2 and thence to antenna 1.

The pilot signal, designated $f_0(R)$ in FIG. 2B, is transmitted from the earth station antenna 1 to the satellite as a right-hand circularly polarized (RHCP) wave. In the propagation path to the satellite, the pilot signal may encounter a rainfall region and undergo counter-direction rotation in the polarization plane as it passes through it, resulting in the generation of a left-hand circularly polarized (LHCP) signal $f_0(L)$. This signal is received by an antenna 25a of the satellite and amplified by a feeder 26, converted to a downlink frequency signal $F_0(R)$ by a frequency converter 27 and passed through a feeder 28 to an antenna 25b for transmission back to the earth as a cross-polarization interference and received by the earth station antenna 1. After passing through phase shifters 3 and 4, orthomode transducer 5, one of the amplifiers 6a and 6b and through the branching circuit 8, the cross-polarization interference $F_0(R)$ is converted to an intermediate frequency signal by a frequency converter 15 and applied to a synchronous detector 14 to which the modulating pulse sequence from pulse generator 10 is also supplied through a delay circuit 13. This delay circuit is to introduce a delay time corresponding to the round-trip propagation delay, which is approximately 250 milliseconds, so that the received pilot signal is properly timed with respect to the modulating pulse sequence.

By synchronous detection a DC signal varying in proportion to the level of the cross-polarization interference $F_0(R)$ is obtained at the output of synchronous detector 14. Because of the use of a pulse sequence, the synchronous detector 14 is highly tolerant of noise for detecting the interference component.

The DC output from synchronous detector 14 is applied to a stepwise tracking controller 16 to which a signal from downlink cross-polarization interference canceller 7 is also applied. As will described, stepwise tracking controller 16 generates fine mode cancelling control signals to minimize residual components which remain in the uplink cross-polarization interference after the coarse mode is effected by correlation calculator 19. The fine mode cancelling control signals are combined with the coarse mode cancelling control signals by adders 17a and 17b from correlation calculator 19 and supplied respectively to the 180° and 90° phase shifters 24 and 23 as uplink's cross-polarization interference cancelling control signals.

Correlation calculator 19 estimates an uplink's cross-polarization interference by calculating the correlation between the downlink interference cancelling control signals from the downlink canceller 7, which have been derived from the beacon signal from the satellite, and supplies the estimated uplink's cross-polarization interference components as the coarse mode signals through adders 17a and 17b to the phase shifters 23 and 24 in a manner known in the art to respectively adjust their angle settings in a direction toward a near optimum points. Since the information carried by the beacon signal concerns exclusively of the factors affecting the downlink side of the system, it is insufficient to satisfactorily cancel the cross-polarization interference of the uplink side with the correlation canceller 19.

In order to supplement the insufficiency of the cancellation by the correlation calculator 19, stepwise tracking controller 16 provides fine mode cancellation using the level of a cross-polarization component as represented by the output of synchronous detector 14. Preferably, the uplink interference canceller 9 utilizes the level of a downlink interference provided by the downlink interference canceller 7, in addition to the output of synchronous detector 14, to compensate for a rapid change in a rainfall condition which may occur during a satellite-earth round-trip propagation delay time following a stepwise tracking control procedure.

Figure 3:
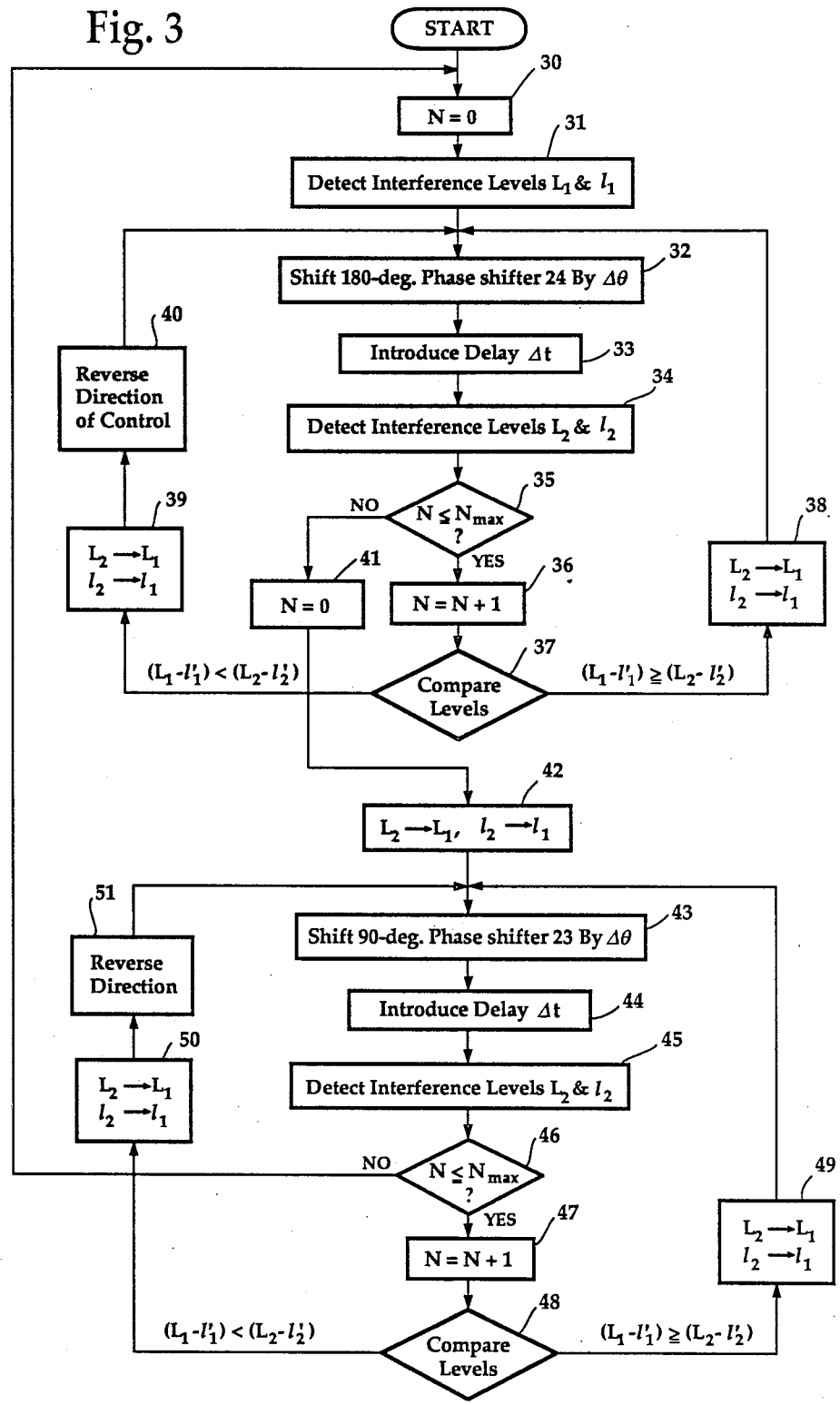
FIG. 3 is a flowchart describing the operation of the stepwise tracking controller of FIG. 2A.

Stepwise tracking controller 16 is programmed to perform instructions described in the flowchart of FIG. 3. The program starts with a subroutine for controlling the 180° phase shifter 24. This subroutine begins with operations block 30 which directs the resetting of a count N to zero. Exit then is to operations block 31 which detects the level of a DC output from the synchronous detector 14 and the level of a downlink interference component supplied from the downlink interference canceller 7 and stores them respectively as $L_1$ and $l_1$ in memory. Control then exits to operations block 32 to vary the angle setting of 180° phase shifter 24 by a predetermined amount $\Delta\theta$ in a given direction. The uplink interference canceller 9 then waits for the return of the pilot signal by introducing a delay time $\Delta t$ corresponding to the round-trip propagation delay (block 33). Control then proceeds to block 34 to detect the level of an output signal from synchronous detector 14 which is derived from the returning pilot signal, as well as the level of a downlink interference component from the canceller 7 and stores them as $L_2$ and $l_2$ in memory, respectively. Exit then is to decision block 35 which checks to see if the count N is equal to or smaller than a maximum value $N_{max}$. If it is, control advances to operations block 36 to increment the count N by one and proceeds to decision block 37 to compare between the previous and recent values of interference components, i.e., $L_1$ and $L_2$. Preferably, the comparison is made between $(L_1-l'_1)$ and $(L_2-l'_2)$ to compensate for a change in a rainfall condition which might have caused the result of the $\Delta\theta$ variation of the 180° phase shifter 24 on the detected interference to deviate from an intended result (where $l'_1$ and $l'_2$ are weighted values of $l_1$ and $l_2$, respectively). If $(L_1-l'_1)$ is equal to or greater than $(L_2-l'_2)$, control proceeds to operations block 38 to relocate data $L_2$ and $l_2$ to the locations of data $L_1$ and $l_1$, respectively, and control returns to block 32 to repeat the above process, so that 180° phase shifter 24 is successively varied by $\Delta\theta$ in the same direction. If $(L_1-l'_1)$ is smaller than $(L_2-l'_2)$, the previous step change is judged as being invalid and control proceeds to operations block 39 to relocate interference data $L_2$ and $l_2$ to the locations of data $L_1$ and $l_1$, respectively, and proceeds to operations block 41 to reverse the direction of step change, and returns to block 32. It will be seen therefore that as the above process is repeated in an appropriate direction the uplink cross-polarization interference will decrease and the count value N will reach the maximum value. Maximum count value $N_{max}$ is so determined in relation to the amount of step change $\Delta\theta$ that the output level of synchronous detector 14 will reduce to a minimum under all possible rainfall conditions when count N becomes equal to $N_{max}$. Therefore, when the answer in decision block 35 becomes negative, the 180° phase shifter 24 has been adjusted to a near optimum setting.

Control now enters the next subroutine to perform stepwise phase shift control on the 90° phase shifter 23 by initially resetting the count N to zero (block 41) and relocating the interference data $L_2$ and $l_2$ to the locations of data $L_1$ and $l_1$ (block 42). The setting of 90° phase shifter 23 is varied by $\Delta\theta$ (block 43) and a delay time $\Delta t$ is introduced to allow the canceller 9 to wait for the return of the pilot signal (block 44). Control then proceeds to block 45 to detect the level of an output signal from synchronous detector 14 which is derived from the returning pilot signal, as well as the level of a downlink interference component from the canceller 7 and stores them as $L_2$ and $l_2$ in memory, respectively. Count N is compared with the maximum count $N_{max}$ (block 45) and incremented by one (block 47). Control proceeds to decision block 48 to compare the previous value of interference $(L_1-l'_1)$ with the recent value of interference $(L_2-l'_2)$. If the previous value is equal to or greater than the recent value, control proceeds to operations block 49 to relocate data $L_2$ and $l_2$ to the locations of data $L_1$ and $l_1$, respectively, and returns to block 43 to repeat the above process, so that 90° phase shifter 23 is successively varied by $\Delta\theta$ in the same direction. If the previous value is smaller than the recent value, the previous stepwise control is judged as being invalid and control proceeds to operations block 50 to relocate interference data $L_2$ and $l_2$ to the locations of data $L_1$ and $l_1$, respectively, and proceeds to operations block 51 to reverse the direction of phase control on the 90° phase shifter 23, and control returns to block 43. It will be seen therefore that, as the above process is repeated in an appropriate direction, the count value N becomes equal to the maximum value $N_{max}$, and the rotatable 90° phase shifter 23 has been precisely adjusted to an optimum setting and the uplink cross-polarization interference will decrease to a minimum. When this occurs, control returns to the beginning of the program ready to repeat the above-mentioned subroutines.

It is found that the interference variations have a good orthogonallity and assume a simple concave function in response to the phase shifter's step changes. Therefore, the stepwise phase shift control of the present invention has a good convergence effect on the uplink's interference components.

It will be seen therefore that due to the stepwise phase shift changes as a fine mode measure the correlation calculator 19 can be simplified to the level of implementation by the first order of conversion. Since only one pilot signal is used and the level of this signal is used to detect the amount of interference, the present invention eliminates the need for a high power amplifier to be used exclusively for interference cancellation. A further advantage of the present invention is that it simplifies the circuitry for detecting the pilot signal, eliminating the need for complicated synchronous detector circuitry as currently used, thus simplifying the earth station equipment. In addition, the present invention can be employed to any earth station regardless of the types of satellite.

The foregoing description shows only one preferred embodiment of the present invention. Various modifications are apparent to those skilled in the art without departing from the scope of the present invention which is only limited by the appended claims. Therefore, the embodiment shown and described is only illustrative, not restrictive.

What is claimed is:

1. An uplink cross-polarization interference canceller of a satellite communications earth station, the earth station including a rotatable 90° phase shifter and a rotatable 180° phase shifter connected in circuit for introducing variable phase shifts to a pilot signal, means for transmitting said phase-shifted pilot signal to the satellite, means for receiving said pilot signal returning from said satellite, and means for detecting downlink cross-polarization interference cancellation control signals from a beacon signal transmitted from said satellite, comprising:
   pulse generator means for generating a pulse sequence;
   amplitude modulator means for modulating the amplitude of a carrier with said pulse sequence to produce an ASK signal as said pilot signal;
   correlation calculator means for estimating uplink cross-polarization interference components from said downlink cross-polarization cancellation control signals and adjusting the angle settings of said - 90° and 180° phase shifters in accordance with the estimated interference components;
   synchronous detector means for synchronously detecting the received pilot signal with said pulse sequence and generating a DC signal representative of an uplink cross-polarization interference; and
   stepwise tracking control means for stepwisely varying the angle settings of said rotatable 90° and 180° phase shifters by predetermined amounts, detecting previous and recent values of said DC signal resulting from the stepwise variations of said angle settings, and repeating the stepwise variations of said angle settings until a difference between said previous and recent values is substantially reduced to a minimum.

2. An uplink cross-polarization interference canceller as claimed in claim 1, wherein said stepwise tracking control means derives a correction signal representative of a weighted value of downlink cross-polarization interference as an indication of a change in rainfall condition, subtracts said correction signal from said DC signal so that said previous and recent values are corrected by said change, and repeats the stepwise variations of said settings until a difference between the corrected previous value and the corrected recent value is substantially reduced to a minimum.

3. An uplink cross-polarization interference canceller as claimed in claim 1, wherein said stepwise tracking control means has first and second memory locations and is programmed to perform the sequential steps of:
   (a) detecting the level of a DC signal from said synchronous detector means and storing data indicating the detected level in said first memory location;
   (b) varying the angle setting of one of said rotatable 90° and 180° phase shifters by said predetermined amount:
   (c) detecting the level of a DC signal from said synchronous detector means and storing data indicating the detected level in said second memory location;
   (d) determining which one of the data stored in the first memory location and the data stored in the second memory location is greater than the other and determining therefrom whether the setting variation by the step (b) is valid or invalid;
   (e) if said angle setting variation is valid, relocating the data in said second memory location to said first memory location and repeating the steps (b) to (d) by a predetermined number of times;
   (f) if said angle setting variation is invalid, relocating the data in said second memory location to said first memory location;
   (g) varying the angle setting of said one of said rotatable 90° and 180° phase shifters by said predetermined amount in a direction opposite to a direction in which the setting is varied by the step (b);
   (h) repeating the steps (c), (d) and (g) by said predetermined number of times; and
   (i) relocating the data in said second memory location to said first memory location and repeating the steps (b) to (h) with respect to the other of said rotatable 90° and 180° phase shifters.

4. An uplink cross-polarization interference canceller as claimed in claim 2, wherein said stepwise tracking control means has first and second memory locations and is programmed to perform the sequential steps of:
   (a) detecting the level of a DC signal from said synchronous detector means and the level of a downlink cross-polarization interference and storing the detected levels as data $L_1$ and $l_1$ in said first memory locations;
   (b) varying the angle setting of one of said rotatable 90° and 180° phase shifters by said predetermined amount:
   (c) detecting the level of a DC signal from said synchronous detector means and the level of the downlink cross-polarization interference and storing the detected levels as data $L_2$ and $l_2$ in said second memory locations;
   (d) determining which one of $(L_1-l'_1)$ and $(L_2-l'_2)$ is greater than the other (where $l'_1$ and $l'_2$ are weighted values of $l_1$ and $l_2$, respectively) and determining therefrom whether the angle setting variation by the step (b) is valid or invalid;
   (e) if said angle setting variation is valid, relocating the data $L_2$ and $l_2$ in said second memory locations to said first memory locations and repeating the steps (b) to (d) by a predetermined number of times;
   (g) if said angle setting variation is invalid, relocating the data $L_2$ and $l_2$ in said second memory locations to said first memory locations;
   (h) varying the angle setting of said one of said 90° and 180° phase shifters by said predetermined amount in a direction opposite to a direction in which the angle setting is varied by the step (b);
   (i) repeating the steps (c), (d) and (h) by said predetermined number of times; and
   (j) relocating the data $L_2$ and $l_2$ in said second memory locations to said first memory locations and repeating the steps (b) to (i) with respect to the other of said rotatable 90° and 180° phase shifters.

* * * * *